United States Patent [19]

Bauman et al.

[11] Patent Number: 4,666,249

[45] Date of Patent: May 19, 1987

[54] SURFACE-TREATED CONTACT LENS AND METHOD OF PRODUCING

[75] Inventors: Robert E. Bauman, Glendale; S. Kumar Chandrasekaran, Paradise Valley; Shaow B. Lin, Phoenix; Lyle M. Bowman; Thomas B. Harvey, III, both of Scottsdale, all of Ariz.

[73] Assignee: Sola U.S.A. Inc., Phoenix, Ariz.

[21] Appl. No.: 765,891

[22] Filed: Aug. 14, 1985

[51] Int. Cl.$^4$ .............................................. B29D 11/00
[52] U.S. Cl. ................................ 351/160 H; 264/1.4; 264/1.7; 264/1.8; 264/2.6
[58] Field of Search ................. 264/1.4, 2.1, 2.6, 1.1, 264/1.7, 1.8; 351/160 H

[56] References Cited

U.S. PATENT DOCUMENTS

| | | | |
|---|---|---|---|
| T102,101 | 8/1982 | Drake et al. | 525/183 |
| 3,389,012 | 6/1968 | Hamm. | |
| 3,476,499 | 11/1969 | Wichterle | 351/160 H |
| 3,489,491 | 1/1970 | Creighton | 351/160 |
| 3,619,044 | 11/1971 | Kamath | 351/160 |
| 3,880,818 | 4/1975 | Shen et al. | 351/160 H |
| 3,944,847 | 3/1976 | Barkdoll et al. | 351/160 |
| 3,959,102 | 5/1976 | Wajs et al. | 264/2.6 |
| 4,022,855 | 5/1977 | Hamblen | 264/2.1 |
| 4,055,378 | 10/1977 | Feneberg et al. | 264/1.4 |
| 4,093,361 | 6/1978 | Erickson et al. | 351/160 |
| 4,121,885 | 10/1978 | Erickson et al. | 351/160 H |
| 4,208,362 | 6/1980 | Deichert et al. | 351/160 H |
| 4,252,421 | 2/1981 | Foley, Jr. | 351/160 H |
| 4,312,575 | 1/1982 | Peyman et al. | 351/160 H |

FOREIGN PATENT DOCUMENTS

| | | | |
|---|---|---|---|
| 29402 | 8/1980 | Japan | 264/1.7 |
| 71830 | 4/1984 | Japan | 264/1.4 |

Primary Examiner—James Lowe
Attorney, Agent, or Firm—Charles E. Cates; David A. Lowin

[57] ABSTRACT

A contact lens for correction of astigmatism is formed from a single polymeric or copolymeric material. The lens has a central optical zone of greater rigidity than a surrounding non-optical zone. The rigidity of the central optical zone is sufficient for it to retain an astigmatism-correcting shape when worn on an eye, while the surrounding non-optical zone conforms to the shape of the eye.

35 Claims, No Drawings

SURFACE-TREATED CONTACT LENS AND METHOD OF PRODUCING

BACKGROUND OF THE INVENTION

1. Field of the Invention

The present invention relates to contact lenses, more particularly to contact lenses for the correction of astigmatism. Specifically, the invention relates to a contact lens having a central optical zone which has been hardened by selectively surface treating a lens.

2. Background Technology

Astigmatism is a defect of an optical system (such as the eye) in consequence of which rays of light emanating from a point fail to meet in a focal point after passing through the optical system, resulting in a blurred and imperfect image. In the eye, this is usually the result of a mis-shaped (or toric) cornea.

Correction of astigmatism has been accomplished in the past through the use of a toric contact lens. Both rigid and soft contact lens materials have been used for making such toric lenses.

In the rigid lens category, a toric back surface corneal contact lens was originally (and principally) used to accomodate a toric cornea; not to correct astigmatic refractive error. It has been found possible to correct astigmatism by orientation of the meridional properties of a lens to properly orient its cylinder. For example, a bitoric corneal contact lens employs an additional toric surface on the front of the lens, thereby assuring proper fit by the base curve's toricity and correcting the astigmatism through the optical properties of the front curve's toricity.

Soft or hydrogel lenses have also been designed to correct astigmatism. Due to the flexibility of the lens material, these lenses tend to conform (although not perfectly) to the shape of the cornea on which they are worn. Introduction of a toric curve on the front or the base surface of a lens (but not on both surfaces) has been successful, since the entire lens assumes the cornea's shape, leaving the single surface's toricity to coact with such assumed shape, providing the functional equivalent of a rigid bitoric lens.

Both in the rigid and soft toric lenses of the past, rotational stability was required in order to maintain the orientation of the lens' cylinder vis a vis the cornea. Thus, a variety of lens orientation techniques have been developed. These include prism ballast (a thickened base portion), single and double truncations (removal of a segment at the apex or ballast of the lens), and slab-off (selective reduction of edge thickness).

While the above-described lenses have enjoyed a certain amount of success, they have also suffered from a number of deficiencies. Providing two powers on the optical curve and coordinating those powers with the rotational stabilizing means has made such lenses very difficult and expensive to manufacture, often resulting in very low yields. Another problem with prior toric corneal lenses is discomfort. This is usually due to the thickness of the lens (the lenses have to be made thicker to accomodate the mis-shaped cornea and to incorporate prism for rotational stability).

Another technique for treating astigmatism with contact lenses is the combination "hard/soft" concept. This attempts to combine the comfort benefits of a soft lens with the shape retaining characteristics of a rigid lens. Thus, the optical zone of the lens is formed of a hard material approximating the shape of a "perfect" cornea on the base curve. The tear layer entrapped between the lens and the cornea serves as a refracting medium having the shape defined by the base curve, thereby correcting the astigmatic error of the mis-shaped cornea below. At the same time, the softer, thinner periphery of the lens conforms to the cornea and supports the optical zone in position, resulting in greater comfort for the wearer. The front curve of the lens can also be selected to correct for other refractive errors. A principal advantage of these lenses is that they do not require the rotational stabilizing means described above. Improved user comfort is another significant advantage.

Some multi-stage processes for preparing "hard/soft" corneal contact lenses are described in U.S. Pat. Nos. 3,489,491 (Creighton); 3,619,044 (Kamath); 3,944,347 (Barkdoll et al.); and 4,093,361 (Erickson et al.).

The "hard/soft" lens, like the toric lenses described above, suffers from certain disadvantages. These disadvantages arise primarily in the manufacture of the lens. It is very difficult to fuse the two materials together to give a lens without unacceptable boundaries. Even when the fusion process is successful, these lenses are still difficult and expensive to manufacture. Also, the known techniques for making "hard/soft" lenses are not adaptable to the manufacture of a molded lens. In addition to these manufacturing disadvantages, the center thickness of such lenses has been noted as a cause of discomfort, and therefore, another disadvantage.

For a more detailed description of astigmatism and the corneal contact lenses which have been used for its correction, see *Contact Lens Practice, Third Edition*, by Robert B. Mandell, O.D., Ph.D. (Published by Charles C. Thomas, 1981).

3. Aspects of the Invention

In one aspect, the present invention provides a corneal contact lens for the correction of astigmatism, such lens being thinner than prior astigmatism-correcting lenses for increased comfort and oxygen transmission in the eye of its wearer.

In another aspect, the invention provides a comfortable corneal contact lens for the correction of astigmatism, which lens is easy and inexpensive to manufacture.

Still another aspect of the invention provides a method of treating a soft corneal contact lens replica to give additional rigidity characteristics to a central portion thereof, so that it can be used to correct astigmatism.

Yet another aspect of the invention provides a non-fused contact lens without any rotational stabilizing means, for the correction of astigmatism.

SUMMARY OF THE INVENTION

A "hard/soft" corneal contact lens, made from a single polymeric material, has a central optical zone of increased rigidity. This rigidity is provided by treating a portion of a surface of the lens, e.g. the portion corresponding to the optical zone.

One lens embodiment of the present invention can be prepared by contacting at least a portion of the anterior and/or posterior surface of a contact lens replica with a crosslinking agent, followed by exposure to a controlled source of polymerizing energy, e.g. on only the portion of the replica corresponding to the portion of the lens in which additional rigidity is desired.

Another lens embodiment of the present invention is prepared by treating a soft contact lens replica with an esterifying agent for a sufficient period of time to modify at least a portion of polymer molecules on an outer surface of the replica, e.g. by esterifying hydroxyl groups on the polymer molecules. A similar treatment can be effected on polymers having surface acid groups, by first converting the acid to a halide (e.g. a chloride) and then proceeding with the esterification as described. The portion of the outer surface on which the treatment is performed can be selected by masking an annular portion of the anterior, posterior or both surfaces of the contact lens replica, before exposing it to the esterification process.

DETAILED DESCRIPTION OF THE PREFERRED EMBODIMENTS

Selective Crosslinking Embodiment

In one embodiment of the present invention, a contact lens replica is contacted with a crosslinking agent. Then, only that portion of the replica corresponding to the portion of the lens in which additional rigidity is desired is exposed to a source of polymerizing energy, such as radiation or heat. This can be accomplished by using focusing means (such as a diaphragm, lens and/or shutter in conjunction with the radiation source) or by masking the crosslinker-treated replica's surface(s) before exposing the replica to the source of polymerization energy. For example, the support which holds the lens for exposure to the radiation source can serve as a mask. A spot heat probe can be used for thermally initiated polymerization, or, a portion of the replica can be masked with a heat shield. Alternatively, the crosslinking agent or a polymerization initiator can be selectively applied to a portion of the surface of the replica, e.g. by using a mask or by controlled application (such as brushing) of the solution onto the replica's surface. Post-treatment may be required to extract from the surface any crosslinker which has not polymerized.

Suitable contact lens materials include any commonly used crosslinkable soft lens polymer or copolymer, for example: hydroxyethyl methacrylate, glycerl methacrylate, and crofilcon A.

Suitable crosslinking agents include, for example: tetraethyleneglycoldimethacrylate ("TEGDMA"), ethyleneglycoldimethacrylate ("EGDMA"), bis(Methacryloxypropyl)tetramethyldisiloxane ("MADTMS Dimer"), and trimethylolpropane trimethacrylate ("TMPTMA").

Suitable polymerization initiators include, for example: benzoin methyl ether ("BME"), 2,2'-azobisisobutyronitrile ("AIBN"), isopropylperoxydicarbonate ("IPP"), methyl ethyl ketone peroxides ("Lupersol DDM-9"), and t-Butylperoxy pivalate ("TBPP").

The time of exposure to the polymerization energy source can vary depending on the source chosen and the degree of crosslinking desired. Also, as described above, a suitable media can be chosen to govern the extent to which the crosslinking agent penetrates the polymer surface of the replica.

Radiation dosages (to be used in conjunction with typical UV initiator sources) range from 0.01 mW/cm$^2$, at temperatures from ambient to about 70°, for a time period ranging from 5 minutes to 3 hours. Thermal polymerization temperatures range from 30° C. to 70° C., for a time period ranging from 5 hours to 24 hours. When using AIBN as an initiator, a combination of both UV and thermal polymerization can be used.

Selective Esterification Embodiment

In general, any polymer which contains a hydroxyl group capable of reacting with an appropriate functional group of the esterifying agent (as defined hereinafter) may be successfully treated in accordance with this embodiment of the invention. Since the acrylic polymers which contain hydroxyl ester groups currently enjoy the most widespread commercial acceptance, specific reference will be made to these acrylic esters in the description of the invention which follows.

To effect the desired modification of the polymer, an esterifying agent is used in a presently preferred embodiment of the invention. Suitable such compounds include organic acids and acid anhydrides, preferably containing no other functional group, and preferably where the organic (non-carboxyl) moiety is $C_1$–$C_8$ alkyl (including cycloalkyl), halogen-substituted $C_1$–$C_8$ alkyl, or silicone-substituted $C_1$–$C_8$ alkyl. Presently particularly preferred compounds include acetic anhydride, trimethyl anhydride, and trifluoroacetic anhydride.

The esterification preferably takes place in the presence of a mild base such as pyridine, N,N-dimethylaminopyridine, pyrrolidylpyridine, or tertiary amines such as trimethylamine or triethylamine.

The esterification is preferbly carried out in the presence of a suitable medium for the esterifying agent, e.g. a diluent, which forms a solution with the esterifying agent and the base (if present), and which does not adversely affect the lens material. Typical of the suitable media include aprotic solvents such as aliphatic or aromatic hydrocarbons (e.g. benzene or toluene) and halogenated hydrocarbons (e.g. $CCl_4$ or $CHCl_3$). The diluent should not cause significant swelling (solvation) of the xerogel structure, as this could lead to reaction throughout the lens material. For example, alcohols are unlikely to be suitable media; water is not a suitable medium.

Alternatively, the medium may be chosen to cause some slight swelling of the surface regions of the xerogel structure, if a deeper penetration of the esterifying agent into the lens (i.e. deeper modification of the lens) is desired. This may provide for a more even overall modification of the surface. Suitable media which cause slight swelling include, e.g. N,N-dimethylacetamide and methyl pyrrolidone.

The esterifying agent will typically be present in between 10 and 30% (e.g. about 20%) by volume with respect to the diluent, and the base will typically be present in between 1 and 5% (e.g. about 2%) by volume with respect to the solvent. A typical solution, then, could contain 100 parts of toluene, 20 parts of acetic anhydride, and 2 parts of pyridine (all in parts by volume).

As described above, one process of this invention involves contacting a contact lens replica with any one of the aforesaid esterifying agents for a sufficient period of time to effect the desired modification of the polymer. To carry out the process, the contact lens replica (in the xerogel state) is masked to leave exposed only that portion of its surface(s) on which treatment is desired. For example, this can be accomplished by providing an opening in a carrier used to hold the replica when exposing it to the treatment, e.g. a clamping fixture with a silicone rubber gasket. Alternatively, the portion(s) of the surfaces on which treatment is not desired can be covered with a protective layer of pitch, wax, or another polymer (e.g. a hydrolyzable polymer) which can later be removed without adversely affecting the surface portion which it protected. The mask should preferably be resistant to the esterifying solution.

The masked replica is then immersed in the selected esterifying compound or a solution thereof, at a temperature ranging generally from about 0° to about 70° C., and maintained therein for a time period ranging from about 5 minutes to about 3 hours. It is to be understood, of course, that for any particular modifying treatment the most satisfactory reaction time will generally be inversely proportional to the temperature, i.e. the time required to effect the modification typically will be shorter as the reaction temperature is increased. Particularly satisfactory results are obtained employing reaction temperatures of 25°–50° C. for 20–60 minutes.

While not wishing to be bound by any particular theory, the treatment is presently believed to be effected by modification of the polymer material by esterification of the hydroxyl groups at or near the surface of the lens or replica by the reagent. Treatment by use of the reagent is also believed to facilitate removal of organic-type impurities (residual monomers and diluents, low molecular weight polymers, solvents used in edging and polishing such as silicone oils, contaminants from lens molds, etc.) from the lens. The reaction of the treating reagent with any water which may be present in the material improves penetration of cleaning solvents (typically hydrophobic) into the material, and thus enhances their effectiveness.

Upon completion of the modification, the treated replica is removed from the esterifying agent, rinsed well, for example with freon or a chlorinated hydrocarbon solvent. The masking can be removed from the replica, either before or after this rinsing, for example by machining on a lathe or by exposure to a suitable chemical agent (e.g. by hydrolysis of the hydrolyzable polymer mask).

The replica is then treated much as an unmodified lens, i.e. boiled in water for about 2 hours to hydrate it and remove residual water-soluble materials present in the lens. The lens may then be soaked in a suitable medium, e.g. water or physiological saline solution for further leaching if desired.

For a fuller understanding of the nature and objects of this invention, the following specific examples are given. These examples are intended merely to illustrate the invention and are not to be construed in a limiting sense. All percentages, proportions, and quantities given in these examples are by weight, unless otherwise indicated.

EXAMPLES

Example I

A finished, xerogel replica of crofilcon A in the 13.8 mm diameter design is clamped in a fixture, masking all but the central 8 mm optical zone. The masking is performed by using a clamp and a silicone rubber gasket. The lens was treated by filling the mask fixture on the base curve side of the lens with a crosslinking solution of:

50% (w/w) methyl methacrylate
47% (w/w) ethylene glycol dimethacrylate
3% (w/w) benzoin methyl ether The solution is allowed to stand in the fixture for 20 minutes and the masking fixture is then removed from the lens. The lens is then rinsed in TF Freon and allowed to air dry for 1 minute. The lens is then placed in a UV chamber with a dosage of 4.5 mW/cm$^2$ and irradiated for 30 minutes. The lens is then removed, placed in water for 15 minutes for hydration, and extracted in a 90/10 water/methanol reflux for 2 hours. After extraction, the lenses are placed in water for 1 hour, and equilibrated in physiological saline for 2 hours.

Example II

The procedure identified above in Example I is repeated, substituting the following for the crosslinking solution:

40% (w/w) methyl methacrylate
40% (w/w) ethylene glycol dimethacrylate
3% (w/w) benzoin methyl ether
7% (w/w) methylpyrrolidone

Example III

A finished, xerogel replica of crofilcon A in the 13.8 mm diameter design is clamped in a fixture, masking all but the central 8 mm optical zone. The masking is performed by using a clamp and a silicone rubber gasket. The lens is treated by dipping the mask fixture into a solution of:

5.0 mL toluene
1.0 mL acetic anhydride
b 0.1 mL pyridine

The fixture is allowed to stand in the solution at 45° C. for 20 minutes and the masking fixture is then removed from the lens. The lens is rinsed in TF Freon. The lens is then removed, placed in water for 15 minutes for hydration, and extracted in a 90/10 water/methanol reflux for 2 hours. After extraction, the lenses are placed in water for 1 hour, and equilibrated in physiological saline for 2 hours.

Example IV

The procedure identified above in Example III is repeated, substituting trifluoroacetic anhydride for the acetic anhydride.

Example V

The procedure identified above in Example III is repeated, substituting pivalic anhydride for the acetic anhydride.

While the present invention has been described with reference to specific embodiments thereof, it should be understood by those skilled in the art that various changes may be made and equivalents may be substituted without departing from the true spirit and scope of the invention. All such modifications are intended to be within the scope of the claims appended hereto.

What is claimed is:

1. A contact lens for correction of astigmatism comprising a lens formed from a single polymeric or copolymeric material, said lens having a central optical zone and a surrounding non-optical zone, said lens at the portion of a surface only of said lens being treated to have increased rigidity sufficient for it to retain a desired shape while being worn in the eye and not conform to the shape of the cornea.

2. The contact lens of claim 1 comprising a treated xerogel replica.

3. The contact lens of claim 1 comprising a hydrated hydrogel formed from a xerogel replica.

4. The contact lens of claim 1 wherein:
said lens comprises an hydroxyl group-containing acrylic acid ester xerogel replica, and a portion of the hydroxyl groups of the polymer molecules present on said treated surface of said replica are esterified.

5. The contact lens of claim 1 wherein said treated surface portion is more crosslinked than the untreated surface portion.

6. A contact lens formed initially from a single crosslinkable polymeric material, said lens having an optical zone and a non-optical zone surrounding the optical zone, wherein a portion of a surface of said lens corresponding to said optical zone is selectively more highly crosslinked than said non-optical zone.

7. A process for the treatment of a xerogel replica of a soft contact lens to increase the rigidity of a central optical zone therein for the correction of astigmatism, said process comprising:
contacting said replica with an esterifying agent for a sufficient period of time to modify at least a portion of polymer molecules present at an outer surface of the replica corresponding to said central optical zone whereby the optical zone surface is more rigid than the surrounding surface.

8. The process of claim 7 wherein:
said replica comprises an hydroxyl group-containing acrylic acid ester xerogel and said esterifying agent modifies the hydroxyl groups of said portion of polymer molecules present on an outer surface of the replica.

9. The process of claim 7 wherein the esterifying agent is selected from the group consisting of organic acids and acid anhydrides.

10. The process of claim 9 wherein the organic (non-carboxyl) moieties of the esterifying agent are selected from the group consisting of $C_1$-$C_8$ alkyl and cycloalkyl, halogen-substituted $C_1$-$C_8$ alkyl and cycloalkyl, or silicone-substituted $C_1$-$C_8$ alkyl and cycloalkyl.

11. The process of claim 9 wherein the esterifying agent is acetic anhydride.

12. The process of claim 9 wherein the esterifying agent is trifluoroacetic anhydride.

13. The process of claim 9 wherein the esterifying agent is trimethylacetic anhydride.

14. The process of claim 7 wherein said treatment is conducted in the presence of a mild base.

15. The process of claim 14 wherein the mild base is selected from the group consisting of pyridine, trimethylamine, triethylamine, N,N-dimethylaminopyridine, and pyrrolidylpyridine.

16. The process of claim 14 wherein the mild base is pyridine.

17. The process of claim 7 wherein said treatment is conducted in the presence of a suitable diluent.

18. The process of claim 17 wherein the suitable diluent is selected from the group consisting of aliphatic and aromatic hydrocarbons and halogen-substituted hydrocarbons.

19. The process of claim 17 wherein the suitable diluent is toluene.

20. The process of claim 17 wherein the suitable diluent is N,N-dimethylacetamide.

21. The process of claim 20 wherein the suitable diluent is N-methyl-2-pyrrolidone.

22. The process of claim 7 comprising masking a portion of at least one of the replica's surfaces, so that only that portion of the surface which is not masked is modified by the process.

23. The process of claim 22 wherein said mask comprises a coating of pitch, wax, another polymer or a masking tool which can be removed without adversely affecting the surface portion which it protected, and which is resistant to the esterifying agent.

24. The process of claim 22 wherein said mask comprises a carrier for holding said replica during exposure to the esterifying agent, said carrier having an opening therethrough corresponding to the portion of the surface(s) to be treated.

25. A process for the treatment of a xerogel replica of soft contact lens having a front surface and a back surface to increase the rigidity of a portion corresponding to a central optical zone therein for the correction of astigmatism, said process comprising:
selectively crosslinking only a portion of at least one surface of said replica corresponding to said central optical zone.

26. The process of claim 25 wherein said treatment comprises:
contacting said replica with a crosslinking agent, and selectively exposing the portion of said replica being treated to a source of polymerizing energy.

27. The process of claim 26 comprising:
masking a portion of at least one of the replica's surfaces, so that only that portion of the surface which is not masked is modified by the process,
wherein said mask comprises a carrier for holding said replica during exposure to the polymerizing energy, said carrier having an opening therethrough corresponding to the portion of the surface to be treated.

28. The process of claim 25 wherein said treatment comprises:
selectively contacting at least one surface of the portion of of said replica being treated with a crosslinking agent, and
exposing said replica to a source of polymerizing energy.

29. The process of claim 25 wherein said chemical treatment comprises:
contacting said replica with a crosslinking agent,
contacting at least one surface of the portion of said replica being treated with a polymerization initiator, and
exposing said replica to a source of polymerizing energy.

30. The process of claim 29 wherein said polymerization initiator is selected from the group consisting of benzoin methyl ether, 2,2'-azobisisobutyronitrile, isopropylperoxydicarbonate, methyl ethyl ketone peroxides, and t-butylperoxy pivalate.

31. The process of claim 25 wherein said treatment comprises:
contacting said replica with a crosslinking agent, and wherein said crosslinking agent is selected from the group consisting of tetraethyleneglycoldimethacrylate, ethyleneglycol-dimethacrylate, bis(Methacryloxypropyl)tetramethyldisiloxane, and trimethylolpropane trimethacrylate.

32. The process of claim 25 wherein said treatment comprises:
exposing said said replica to a source of polymerizing energy, and
wherein said source of polymerizing energy is ultraviolet radiation.

33. The process of claim 25 comprising masking a portion of at least one of the replica's surfaces, so that only that portion of the surface which is not masked is modified by the process.

34. The process of claim 33 wherein said mask comprises a coating of pitch, wax or another polymer, or a masking tool which can be removed without adversely affecting the surface portion which it protected, and which is resistant to deterioration by the crosslinking agent.

35. A contact lens made according to the process of claim 25.

* * * * *